Oct. 30, 1951     R. B. MACPHERSON     2,573,209
PULLEY
Filed Aug. 9, 1947
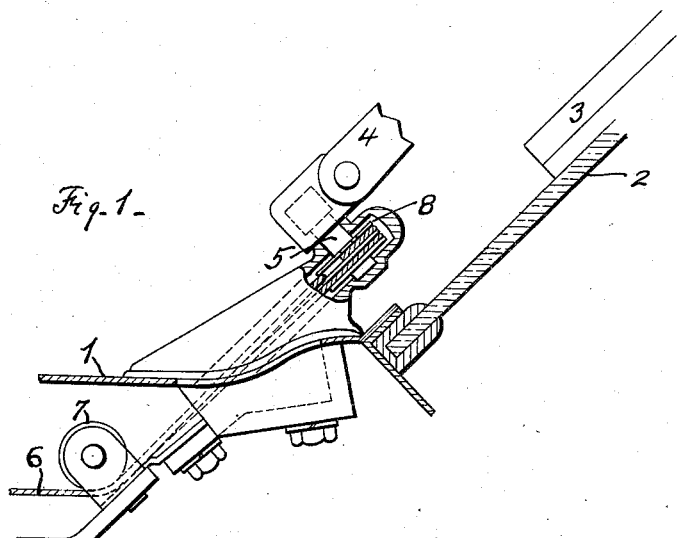
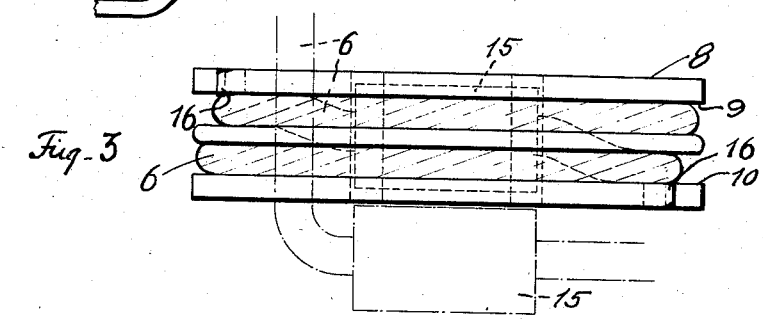
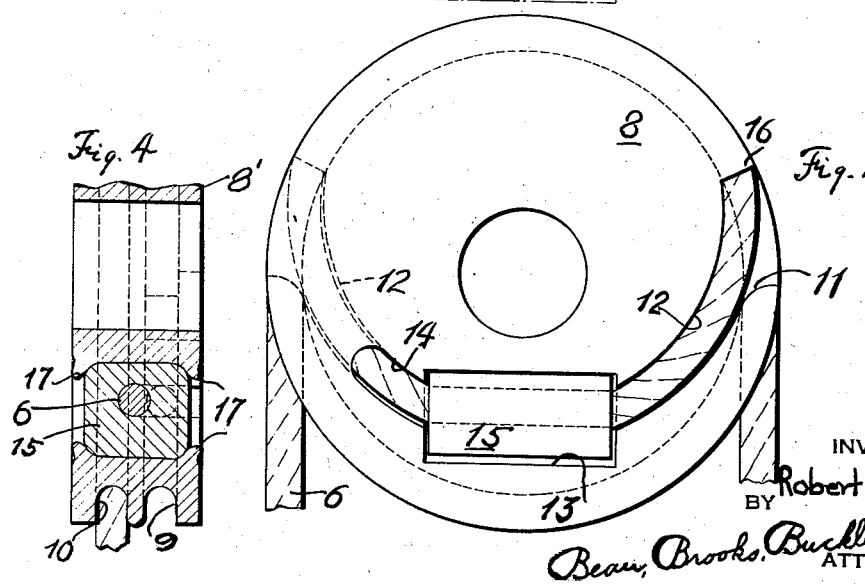
INVENTOR
Robert B. Macpherson
BY
Bean, Brooks, Buckley & Bean
ATTORNEY Patented Oct. 30, 1951

2,573,209

UNITED STATES PATENT OFFICE 2,573,209

PULLEY

Robert B. Macpherson, Buffalo, N. Y., assignor to Trico Products Corporation, Buffalo, N. Y.

Application August 9, 1947, Serial No. 767,725

10 Claims. (Cl. 74—230.01)

This invention relates to the windshield cleaning art and has particular reference to the wiper operating mechanism in which power from the wiper motor is carried up to the cowl mounted wiper by means of a flexible transmission.

The primary object of the invention is to provide an improved construction which will facilitate the installation of the cleaner mechanism on the motor vehicle. A further object of the invention is to provide a practical construction which is durable and efficient in use.

The foregoing and other objects will manifest themselves as the following description progresses, reference being made to the accompanying drawing, wherein:

Fig. 1 is a fragmentary sectional view through a portion of the cowl and windshield of a motor vehicle illustrating a part of the wiper mounted on the cowl;

Fig. 2 is a side elevation of the driven shaft pulley showing a portion of the flexible transmission cable attached thereto in accordance with the teachings of the present invention;

Fig. 3 is an edge view of the pulley depicting in dot and dash lines the position of the cable enlargement before interlocking the same with the pulley; and, Fig. 4 is a detailed sectional view through the pulley but showing a slight modification.

Referring more particularly to the drawing, the numeral 1 designates the vehicle cowl, 2 the windshield glass, 3 the wiper thereon, 4 its actuating arm, and 5 the wiper actuating shaft designed to be driven from a suitable source of power, such as the usual windshield cleaner motor, not shown. This motor may be arranged on the fire wall between the engine compartment and the passenger compartment of the vehicle and operatively connected to the driven shaft 5 by a power transmitting cable 6 which is suitably guided over idlers 7 and operatively takes about a pulley 8 fastened to the driven shaft 5, all as is more particularly set forth in an earlier application of John R. Oishei filed August 21, 1944 under Serial No. 550,327.

In such earlier disclosure the power transmitting cable was anchored to the shaft carried pulley by a frictional embrace effected by passing the cable through a specially formed cable receiving groove. In the present invention the power transmitting cable is definitely and positively interlocked with the pulley to avoid likelihood of slippage and to facilitate the installation of the cleaner mechanism.

As illustrated, the pulley is formed with a pair of peripheral grooves 9 and 10, each opening through a lateral cutout 11, in its outer side wall, into an arcuate groove 12 formed in the respective side face of the pulley. Such arcuate grooves open at their inner ends into a recess or pocket 13 which extends transversely through the pulley body, and one of the arcuate grooves has its inner end in the form of a slot 14 which likewise opens through both faces of the pulley.

Fixedly secured to the cable is a relatively large anchor lug 15, which is received in the pocket 13, as by first threading the wire through the pocket and thereafter positioning the cable portion at one side of the lug in the through slot 14, as indicated by the dot and dash lines of Fig. 3. This through slot facilitates the placement of the lug in its pocket 13 and the laying of the opposite portion of the cable in the arcuate groove before passing both cable portions into their respective peripheral grooves 9 and 10. While it may be possible to interlock the anchor lug with the pulley without the through slot, as by tilting the lug and forcing it into its pocket, nevertheless, the presence of the through slot gives sufficient clearance to permit easy placement of the lug in position.

After placement of the lug, the corner 16 at each junction of the arcuate groove with the peripheral groove is peened over the cable, or, as shown in Fig. 4, the walls of the pocket may be peened over the lug, as indicated at 17, to positively hold the interlocking parts in place. This peening step serves to hold the lug and cable portions in position during installation but otherwise it is possible to dispense with the peening because the cable portions taut in the peripheral grooves will hold the lug in its proper position.

From the foregoing it will be observed that the two peripheral grooves 9 and 10 are entirely distinct, one from the other, and that the cable portion on one side of the anchor lug 15 will engage in one arcuate groove 12 and operate in its adjacent peripheral groove while the opposite cable portion will lie in the opposite arcuate groove and operate in its respective peripheral groove.

The interlock is effective in positively securing the power transmitting cable to the pulley in a definite position which will determine the path of wiper movement on the windshield in accordance with factory specifications, and, while the foregoing description has been given in detail, it is without thought of limiting the invention since the inventive principles involved are capable of assuming other physical embodiments without departing from the spirit of the invention and scope of the appended claims.

What is claimed is:

1. A windshield cleaner mechanism having a wiper actuating shaft with a pulley fixed thereon, and a power transmitting cable taking about the pulley with the latter having a pair of peripheral grooves receiving the cable and opening through their remote side walls into arcuate facial grooves in which latter the cable is secured.

2. A windshield cleaner mechanism having a wiper actuating shaft with a pulley fixed thereon, and a power transmitting cable taking about the pulley with the latter having a grooved periphery receiving the cable and opening through side walls into arcuate grooves in the opposite side faces of the pulley, the inner ends of the arcuate grooves being joined by a connecting passage.

3. A windshield cleaner mechanism having a wiper actuating shaft with a pulley fixed thereon, and a power transmitting cable taking about the pulley with the latter having a pair of peripheral grooves receiving the cable and opening through their remote side walls into arcuate grooves in the opposite side faces of the pulley, the inner ends of the arcuate grooves being substantially equidistant from the shaft axis and joined by a pocket for receiving a cable carried enlargement to interlock the cable to the pulley.

4. A windshield cleaner mechanism having a wiper actuating shaft with a pulley fixed thereon, and a power transmitting cable taking about the pulley with the latter having inwardly extending grooves in its opposite side faces receiving opposite portions of the cable from the periphery of the pulley, the inner ends of the grooves being joined by a pocket opening through both faces of the pulley, and said cable having an enlargement fitting in the pocket between such opposite portions.

5. A windshield cleaner mechanism having a wiper actuating shaft with a pulley fixed thereon, and a power transmitting cable taking about the pulley with the latter having a pair of peripheral grooves receiving the cable and opening through their remote side walls into arcuate grooves in the opposite side faces of the pulley, the inner ends of the arcuate grooves being joined by a pocket opening through both faces of the pulley and an enlargement formed on the cable for fitting into the pocket, one arcuate groove having a through slot opening through the opposite faces of the pulley and into the pocket to receive the cable during placement of the enlargement in the pocket.

6. A windshield cleaner mechanism having a wiper actuating shaft with a pulley fixed thereon, and a power transmitting cable taking about the pulley with the latter having a pair of peripheral grooves receiving the cable and opening through their remote side walls into arcuate grooves in the opposite side faces of the pulley, the inner ends of the arcuate grooves being joined by a pocket opening through both faces of the pulley, each remote side wall being formed over the cable to secure it in the respective arcuate groove.

7. A windshield cleaner mechanism having a wiper actuating shaft with a pulley fixed thereon, and a power transmitting cable taking about the pulley with the latter having a pair of peripheral grooves receiving the cable and opening through their remote side walls into arcuate grooves in the opposite side faces of the pulley, the inner ends of the arcuate grooves being joined by a pocket opening through both faces of the pulley, the opposite ends of the pocket being peened over the enlargement to secure it in position.

8. For a windshield cleaner mechanism, a pulley engageable with a wiper actuating shaft for oscillating the same, and a power transmitting cable taking about the pulley with the latter having spaced cable receiving passages extending inwardly from its periphery and joined at their inner ends by a pocket, the cable being engaged in the passages and having an anchoring enlargement engaged in the pocket.

9. A pulley having a pair of peripheral grooves for receiving a cable and opening through their remote side walls into arcuate grooves in the opposite side faces of the pulley, the inner ends of the arcuate grooves being joined by a connecting passage in which the cable is extended transversely of the pulley with the adjoining cable portions extending angularly in opposite directions into the arcuate grooves and out into the peripheral grooves.

10. A windshield cleaner mechanism having a wiper actuating shaft with a pulley fixed thereon, and a power transmitting cable taking about the pulley with the latter having a pair of peripheral grooves receiving the cable and opening through their remote side walls into arcuate grooves in the opposite side faces of the pulley, the inner ends of the arcuate grooves being joined by a pocket opening through both faces of the pulley.

ROBERT B. MACPHERSON.

REFERENCES CITED

The following references are of record in the file of this patent:

UNITED STATES PATENTS

| Number | Name | Date |
| --- | --- | --- |
| 1,445,107 | Scott et al. | Feb. 13, 1923 |
| 2,225,845 | Richolt | Dec. 24, 1940 |